May 7, 1963 D. A. CARGILL 3,088,197
MANUFACTURING SYSTEM USING FREE FLOATING FIXTURE LINE
Filed Feb. 27, 1961 4 Sheets-Sheet 1
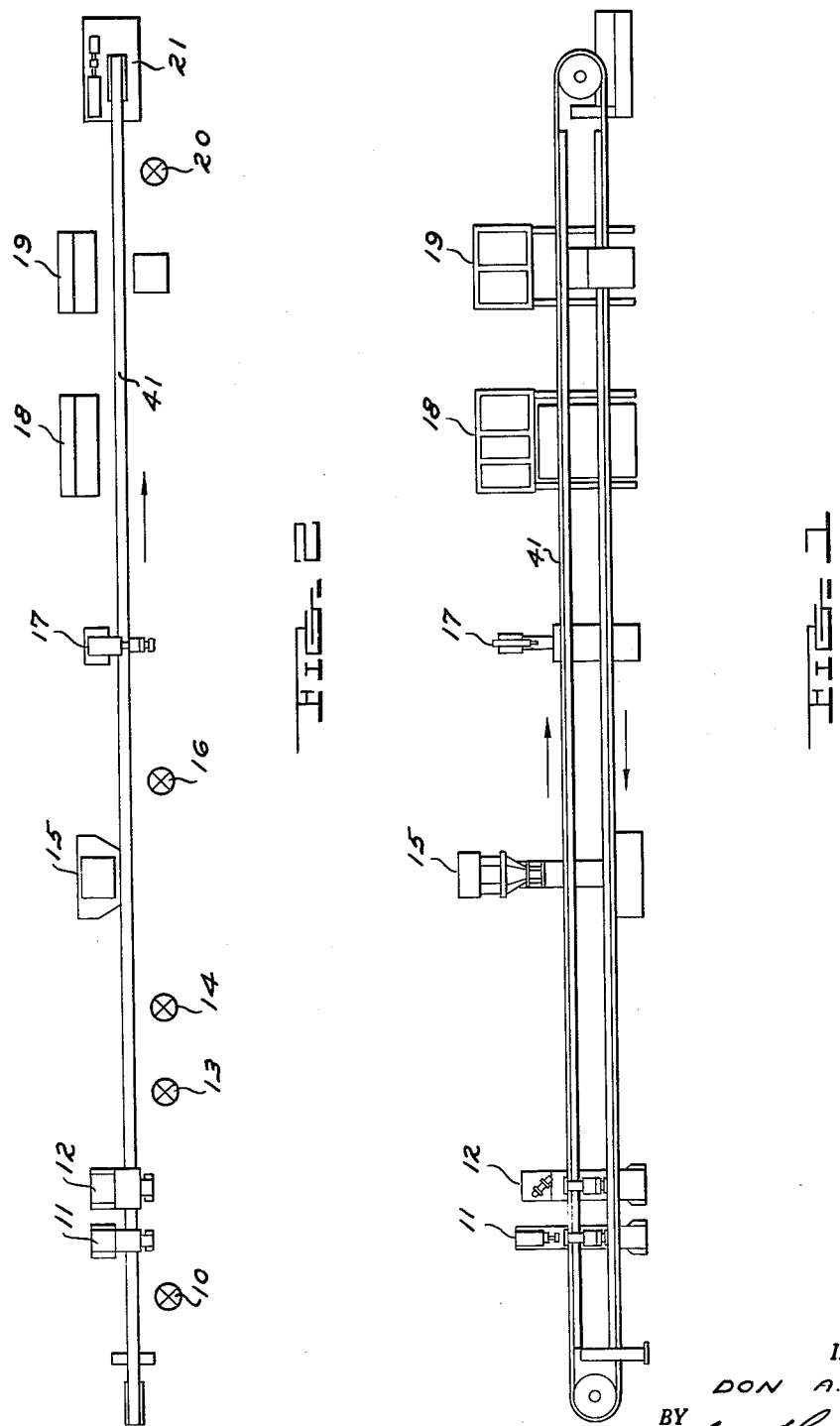
INVENTOR.
DON A. CARGILL
BY
ATTORNEYS

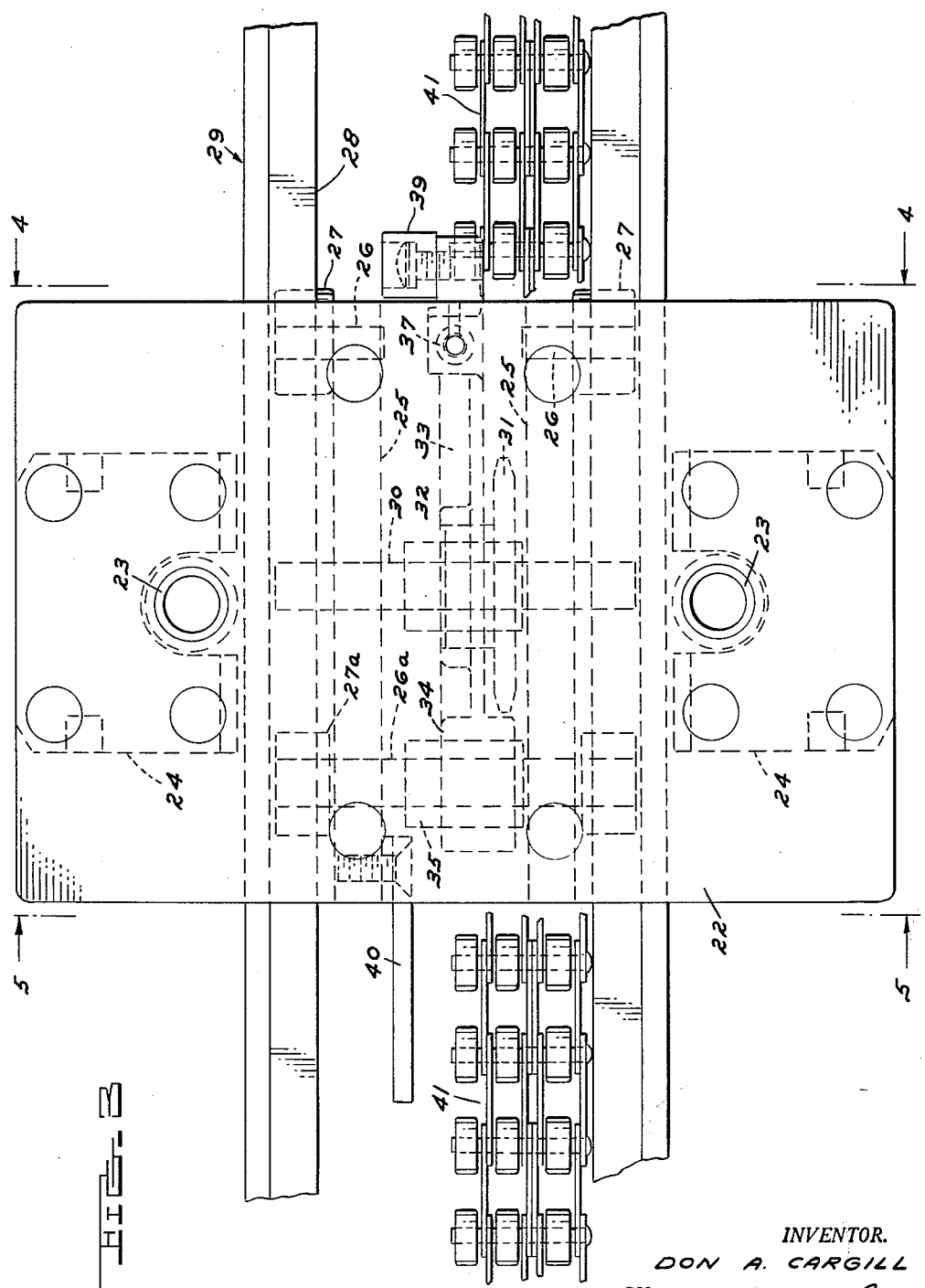

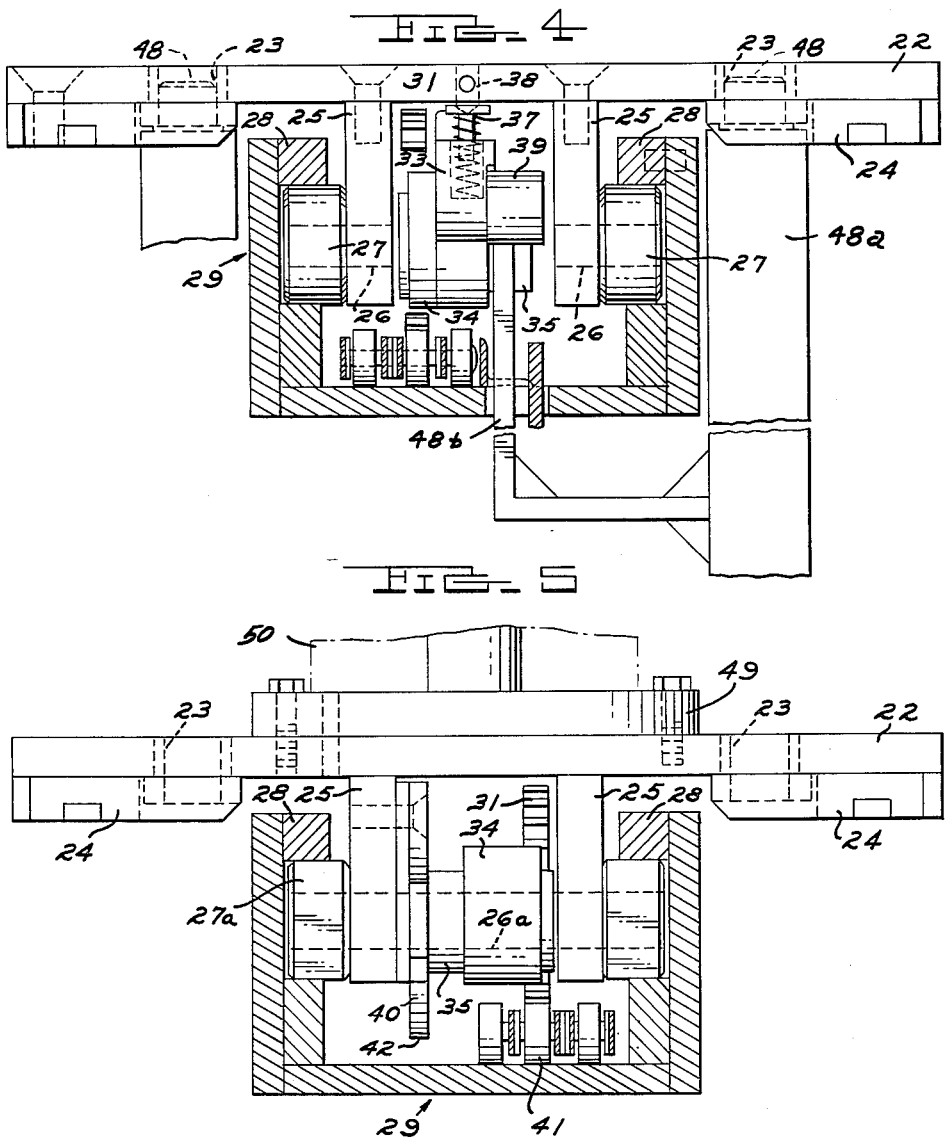

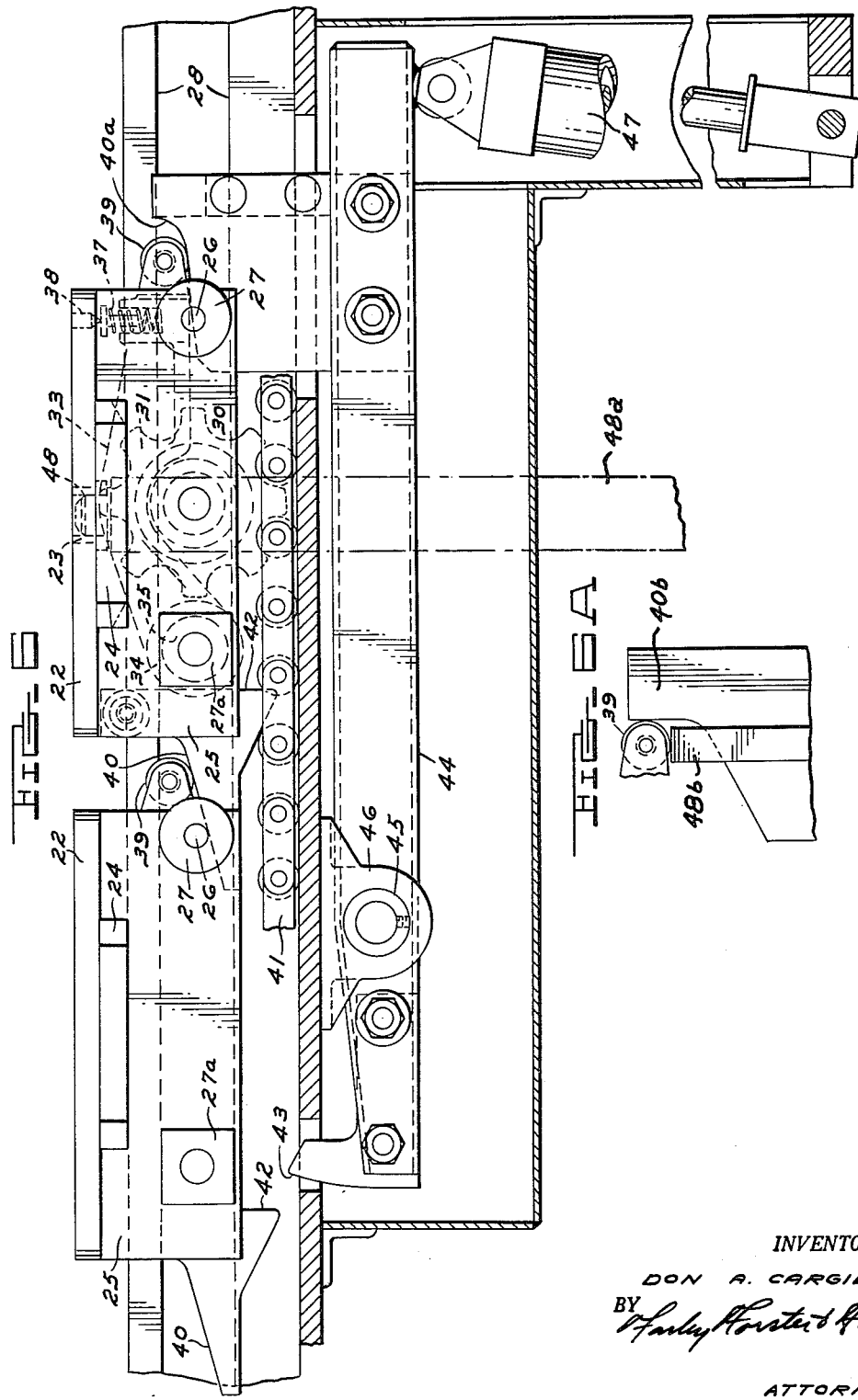

United States Patent Office 3,088,197
Patented May 7, 1963

3,088,197
MANUFACTURING SYSTEM USING FREE
FLOATING FIXTURE LINE
Don A. Cargill, 822 Fairfax, Birmingham, Mich.
Filed Feb. 27, 1961, Ser. No. 91,819
8 Claims. (Cl. 29—200)

This invention relates to a manufacturing system incorporating a free floating fixture conveyor line extending past successive automated work stations which require accurate workpiece location. Provision is made for positive and precisely locatable fixturized workpiece holding throughout the successive manufacturing operations and conveyance therebetween together with provision for a variable "free float" of workpieces between work stations in order to isolate occasional shutdowns or irregularities in the individual operations and thereby avoid their compounding effect on overall production line efficiency.

It is a well known problem of automated manufacturing systems wherein successive operations are synchronized, as in the case of a typical transfer machine having successive work stations, that a temporary shutdown of one operation causes an immediate complete shut down so that the efficiency rates reflecting occasional shutdowns or irregularities in the respective operations are compounded and may frequently result in a very low overall system efficiency even though the efficiency of each individual operation may be relatively high. In applicant's manufacturing system, the "float" of parts between successive operations tends to produce an overall efficiency determined solely by the individual slowest or least efficient operation rather than by the product of the efficiencies of the various operations.

In a preferred embodiment of applicant's manufacturing system, fixturized pallets are provided with clutch means for engaging and disengaging a continuously driven conveyor chain. Interacting means de-clutch successive pallets overtaking a preceding stationary pallet to provide automatic "stacking" of pallets against each other as well as re-engagment of drive when the preceding stationary pallet moves on. Selectively operable de-clutching means at manual work stations provide sufficiently accurate stopping location of the fixturized pallet and more accurately locating positive stop and interengaging means associated respectively with the machine at the work station and the fixturized pallet, such as inter-engageable tapered pins and bushings, provide a precision locating relationship between each fixturized pallet and each automated work station. Workpieces positively located and rigidly clamped on the fixturized pallets are thus accurately located with respect to each automatic machine along the production line and upon completion of the operation, retraction of the de-clutching means or positive stop produces automatic reengagement of the conveyor line drive to carry the fixturized pallet with its workpiece to the next operation.

In the application of this system, different lengths of float space may be provided between different work stations in accordance with anticipated or experienced irregularities in the respective operation. Normally the slowest operation should be allocated the greatest protective float and if such operation is intermediate with production interruptions likely to occur on either side, protection float should be allocated to either side. In such case, parts from preceding operations will normally build up a float of workpieces against the slowest operation which may be drawn from during any upstream work interruption while the space beyond the slowest operation will normally be free of float so that production at the slowest operation may continue in the event of a downstream work stoppage. Thus, the slowest operation may continue during work stoppages on either side and the rate of output at such operation will tend to establish the total output rate independently of irregularities of other operations.

The system is applicable to successive automatic machining operations at successive work stations or successive automatic assembly operations or a combination thereof and the system is also applicable to advantage where manual operations are interspersed with automatic machining or assembly operations. For example, a manual assembly operation in a manufacturing line might take a substantially varying amount of time from piece to piece with an average time generally arrived at over five or six pieces. By protecting such manual operation with a float of a predetermined sufficient number of pieces, the average rate of such operation may be utilized in establishing the line rate whereas in the absence of such float, or if such manual operation had to be synchronized with other automatic operations, the slowest manual rate would have to be utilized in establishing the overall line rate.

From the above brief description, it will be understood that with proper spacing for float between successive operations to accommodate predictable cyclic or occasional variations or irregularities in the individual operations, a much higher order of manufacturing efficiency is possible than in manufacturing systems where successive operations are synchronized and the interruption of one operation interrupts the entire manufacturing line.

The objects and operation of this manufacturing system may be better understood by reference to a specific embodiment thereof illustrated in the drawings forming a part of this disclosure wherein:

FIGURE 1 is a side elevation of an actual typical free floating fuel pump assembly line installation incorporating an inter-mixture of manual, automatic assembly and automatic inspection operations;

FIGURE 2 is a plan view of such installation;

FIGURE 3 is an enlarged plan view of a specific fixturized pallet employed in said fuel pump assembly line installation shown in its relationship with the conveyor track and drive chain therefor omitting the workpiece fixture mounted thereon in order to clarify the showing of pallet suspension and drive;

FIGURE 4 is an end view of the fixture pallet taken along the line 4—4 of FIGURE 3;

FIGURE 5 is an end view of the fixturized pallet and conveyor drive taken along the line 5—5 of FIGURE 3;

FIGURE 6 is a side elevation of a pair of fixturized pallets illustrating both the automatic and selectively controlled drive de-clutching mechanism; and FIGURE 6a is a modified form of retractable positive stop which is used in lieu of the retractable de-clutching ramp shown in FIGURE 6 at certain work stations.

Referring to FIGURES 1 and 2, the conveyor travel for the manufacturing operations is from left to right, while, as shown in FIGURE 1, the lower return flight for the pallets is from right to left. Specific operation stations include a manual loading station 10, an automatic staking station 11, an automatic roll marking station 12, a manual hook diaphragm station 13, a manual load valve body station 14, an automatic six spindle bolt runner station 15, a manual load cover station 16, an automatic single spindle bolt runner station 17, an automatic three station leak test unit 18, an automatic two station prime and pressure test unit 19, and a manual unloading station 20. A conveyor drive 21 actuates a conveyor chain continuously throughout production runs.

It will be noted that substantially different spacing is employed between the respective operations depending on specific requirements. For example, the automatic staking operation is a relatively fast, simple, trouble free operation and a close spacing with respect to preceding and succeeding operations is accordingly appropriate. Sufficient spacing for manual stations (approximately six pieces) is provided to average the variations in time for the manual operations while additional float is provided for the bolt running and inspection operations to protect against predictable irregularities in the automatic performance of these operations. As will be apparent from the later description of pallet and conveyor, no particular or incremental spacing between automatic operations is required so that each automatic machine may be set up independently of the others and adjusted in its longitudinal position from time to time should experience indicate a change in spacing is desirable.

Referring to FIGURES 3 to 6, the fixturized pallet construction employed in this particular assembly line installation comprises a pallet base 22 having a pair of locating bushings 23, held by mounting pads 24, a pair of depending plates 25 mounting the stub axles 26 for two leading wheels 27 and a transverse axle 26a for two square sliding blocks 27a engaging rails 28 of the stationary conveyor track 29. The plates 25 also mount a transverse shaft 30 which pilots the bearing for a sprocket 31 having a hub 32 engageable by a longitudinal clutch arm 33 pivoted at its rear end through a collar 34 mounted on bearings 35 on transverse shaft 26a.

As best shown in FIGURE 6, the forward end of the clutch arm 33 is urged downwardly by spring 37, the compression of which is regulated by adjustment screw 38 in the pallet base, and a cam roller 39 is mounted on the extreme forward end of the clutch arm 33 for engaging either the tail ramp 40 mounted on the rear end of a preceding pallet or a similar retractable ramp 40a located at manual work stations. The cam roller engagement with either of such ramp surfaces operates to raise the clutch arm 33 against spring 37 releasing the sprocket hub 32 permitting the sprocket 31 to rotate freely while engaging the continuously moving conveyor chain 41 thereby de-clutching the pallet from the conveyor drive. The sliding blocks 27a prevent back-travel and premature re-engagement of pallet drive. Release of the cam roller 39 by either the advance of a preceding pallet or retraction of a work station ramp 40a permits the spring 37 to re-engage the clutch arm 33 with sprocket hub 32 stopping rotation of the sprocket thereby causing re-engagement of the conveyor drive.

The compression of the spring 37 is adjusted light enough to permit momentary continued sprocket rotation upon the engagement of a tail dog 42 with a positive retractable stop 43 actuated by an arm 44 pivoted at 45 on a stationary bracket 46, the arm 44 also mounting the retractable ramp 40a under the control of a cylinder 47. Each time the retractable ramp 40a is withdrawn to release a pallet such as shown in FIGURE 6, the positive stop 43 momentarily interrupts the travel of the succeeding pallet until the retractable ramp 40a is restored to its normal intercepting position thereby assuring that each pallet will be intercepted at the work station.

The retractable stop shown in FIGURE 6 is that employed at manual work stations wherein the retraction cylinder 47 is under the control of an operator foot pedal or the like, not shown. In the case of automated operations requiring precise alignment of the workpiece with the automatic machine, a modified form of positive stop 40b is preferred such as shown in FIGURE 6a which will not disengage the clutch arm. A pair of selectively engageable locating pins 48 on retractable arms 48a at each such automatic station engage bushings 23 to finally position the pallet fixture 49 and workpiece 50 rigidly clamped thereon (see FIGURE 5). An extension 48b of the retractable locating pin arm lifts the clutch arm roller 39 upon engagement of the locating pins 48 with bushings 23, as best shown in FIGURE 4, thereby releasing drive during the automatic operation. Such pins mounted in precise relationship with the automatic machine head at the work station are actuated in response to engagement of a limit switch or the like by the fixturized pallet when it reaches the positive stop and are automatically retracted along with the retractable stop upon completion of the operation by control means, not shown.

The embodiment disclosed in the drawings is merely typical of one application of applicant's manufacturing system and may be modified in numerous respects to meet the specific requirements of other applications. For example, the conveyor shown in FIGURE 1 is in the form of a vertical loop while the system is equally applicable in the form of a horizontal conveyor loop, in which case, work stations may be spaced around the entire loop eliminating empty return pallets with manual stations in the center, if desired, and arranged so that a single operator could service manual operations on either side of the conveyor. Here again the flexibility of float would provide a marked advantage since the operator could process several parts on one side of the conveyor while workpieces were accumulating at the manual station on the opposite side and vice versa. The system is also applicable to more complex manufacturing operations employing main and branch conveyor loops and, in fact, has advantageous application to virtually any manufacturing requirement having successive operations performed at successive work stations, at least some of which are automated and require precise fixturized positioning of the workpiece and where it is desirable from an overall efficiency standpoint to isolate variations, irregularities or temporary interruptions of individual operations from the remaining operations.

Many modifications are also possible in the specific form of conveyor, pallet, fixture and clutch arrangement. For example, in some cases, it might be feasible to eliminate the sprocket and clutch arrangement shown in the drawings and merely have one end of the pallet rest in frictional engagement on the chain, particularly in the case of a horizontal conveyor loop where gravity would be equally operative throughout the pallets' complete travel around the conveyor circuit. Numerous modifications of interengaging registration surfaces and mechanisms are also possible with respect to accurately locating the workpiece fixture at respective automatic machine work stations. In some cases, the workpiece may be automatically removed from its conveyor workpiece fixture and transferred to a machine fixture for certain operations. In fact, the broadest aspect of the present invention is a manufacturing method concept wherein a plurality of individual workpieces are accurately located independently of each other at successive independently operated automatic work stations, such individual workpieces being independently admitted, released, and stored before the respective succeeding work stations to provide a variable float of workpieces isolating irregularities in any individual operation from having any immediate effect on preceding or succeeding operations.

Accordingly, it will be understood that these and numerous other modifications may be resorted to without departing from the scope of the invention as defined in the following claims.

I claim:

1. Manufacturing apparatus for performing successive operations on production workpieces at successive work stations, such as successive assembly or machining or combination of machining and assembly operations, characterized by a conveyor line, a plurality of work stations spaced along said conveyor line requiring accurate workpiece location relative thereto, a plurality of fixturized pallets independently movable along said conveyor line, selectively operable interengaging means between said fixturized pallets and said work stations for accurately locating workpieces during the operation at each respective work station independently of the operation at and movement of fixturized pallets relative to other of said work stations, the spacing between certain of said work stations being adequate for a plurality of pallets therebetween.

2. A manufacturing system comprising a conveyor line, a plurality of work stations spaced along said conveyor line for performing successive manufacturing operations including a plurality of automated work stations for performing automatic manufacturing operations upon successive workpieces requiring precise workpiece location at the respective automated work stations, a plurality of fixturized pallets movable along said conveyor line for transporting individual workpieces to said successive work stations, interacting registration means for accurate location of fixturized pallets at the respective automated work stations, means for stopping and accurately locating individual fixturized pallets at said respective individual automated work stations independently of continuing movement and stopping of other fixturized pallets at other work stations, and means for stopping successive fixturized pallets overtaking any preceding unit.

3. A manufacturing system comprising a conveyor line, a plurality of work stations spaced along said conveyor line for performing successive manufacturing operations, certain of said work stations including automatic machinery requiring precise workpiece positioning for its operation, a plurality of fixturized pallets movable along said conveyor line for transporting individual workpieces to said successive work stations, means for stopping individual fixturized pallets at individual work stations and for precisely locating such fixturized pallets as required at said automated work stations independently of continuing movement and stopping of other fixturized pallets at other work stations, and means for stopping successive fixturized pallets overtaking a preceding unit.

4. A manufacturing system comprising a conveyor line, a plurality of work stations spaced along said conveyor line for performing successive manufacturing operations, a continuously moving conveyor extending along said conveyor line, a plurality of workpiece fixtures, means for accurate location of said fixtures at certain of said work stations, means for drive engagement between said conveyor and fixtures for movement between successive operations, selective means for stopping individual fixtures at respective work stations while other fixtures continue to move between stations, said means for drive engagement including selectively operable clutch means for engaging and disengaging said conveyor, said clutch means being capable of slipping upon the engagement of a fixture with a positive stop, and positive stop means being provided at work stations requiring accurate workpiece location.

5. A manufacturing system comprising a conveyor line, a plurality of work stations spaced along said conveyor line for performing successive manufacturing operations, a continuously moving conveyor extending along said conveyor line, a plurality of workpiece fixtures, means for accurate location of said fixtures at certain of said work stations, means for drive engagement between said conveyor and fixtures for movement between successive oprations, selective means for stopping individual fixtures at respective work stations while other fixtures continue to move between stations, said means for drive engagement including selectively operable clutch means for engaging and disengaging said conveyor, said clutch means being capable of slipping upon the engagement of a fixture with a positive stop, positive stop means being provided at work stations requiring accurate workpiece location, and means for operating said clutch means to disengage conveyor drive at work stations where accurate positioning is not critical.

6. Manufacturing apparatus for performing successive operations on production workpieces at successive work stations comprising a conveyor line, a plurality of work stations spaced along said conveyor line, a continuously moving conveyor extending along said conveyor line, a plurality of workpiece fixtures, means for accurate location of said fixtures at certain of said work stations, means for drive engagement between said conveyor and fixtures for movement between successive operations, and selective means for stopping individual fixtures during the operation at each respective work station independently of the operation at and movement of fixtures relative to other of said work stations, said last means including a retractable member for disengaging drive between conveyor and fixture at a work station, means for disengaging drive of a succeeding workpiece fixture overtaking a preceding unit the drive for which has been disengaged by said retractable member, the drive for said preceding and succeeding units being re-established during the period of retraction of said retractable member, and positive stop means for blocking said succeeding unit during said period of retraction.

7. A manufacturing system characterized by a conveyor line, a plurality of work stations spaced along said conveyor line requiring accurate workpiece location relative thereto, a plurality of fixturized pallets independently movable along said conveyor line, each fixturized pallet comprising an assembly of a general purpose pallet having conveyor drive and conveyor track engaging means and a special purpose workpiece fixture rigidly secured in fixed relation to said pallet, means for accurately locating said fixturized pallet relative to said work stations during the operation at each respective work station independently of the operation at and movement of fixturized pallets relative to other of said work stations, the spacing between certain of said work stations being adequate for a pluarlity of pallets therebetween.

8. A manufacturing system characterized by a conveyor line, a plurality of work stations spaced along said conveyor line requiring accurate workpiece location relative thereto, a plurality of fixturized pallets independently movable along said conveyor line, each fixturized pallet comprising an assembly of a general purpose pallet having conveyor drive and conveyor track engaging means and a special purpose workpiece fixture rigidly secured in fixed relation to said pallet, and precise locating means on said pallet fixture assembly for interengagement with cooperating locating means at respective work stations for accurately locating workpieces during the operation at each respective work station independently of the operation at and movement of fixturized pallets relative to other of said work stations, the spacing between certain of said work stations being adequate for a plurality of pallets therebetween.

References Cited in the file of this patent
UNITED STATES PATENTS
2,619,916    Rainier _____ Dec. 2, 1952
FOREIGN PATENTS
338,643    Great Britain _____ Nov. 27, 1930